United States Patent [19]

Saito

[11] Patent Number: 4,593,780

[45] Date of Patent: Jun. 10, 1986

[54] POWER ASSIST STEERING GEAR ASSEMBLY

[75] Inventor: Naoki Saito, Maebashi, Japan

[73] Assignee: Nippon Seiko Kabushiki Kaisha, Tokyo, Japan

[21] Appl. No.: 631,072

[22] Filed: Jul. 16, 1984

[30] Foreign Application Priority Data

Jul. 22, 1983 [JP] Japan .................................. 58-132827

[51] Int. Cl.⁴ .................................................. B62D 5/04
[52] U.S. Cl. ....................................................... 180/79.1
[58] Field of Search ...................... 180/79.1, 142, 141; 74/388 PS, 424.8 R

[56] References Cited

U.S. PATENT DOCUMENTS

| | | | |
|---|---|---|---|
| 2,869,383 | 1/1959 | Rapp et al. ...................... | 74/388 PS |
| 3,983,953 | 10/1976 | Bayle ................................. | 180/79.1 |
| 4,250,765 | 2/1981 | Niklaus et al. ................... | 74/388 PS |
| 4,415,054 | 11/1983 | Drutchas ............................ | 180/79.1 |

FOREIGN PATENT DOCUMENTS 55-44013 3/1980 Japan .
55-44058 3/1980 Japan .
57-120164 7/1982 Japan .

*Primary Examiner*—Harry Tanner
*Attorney, Agent, or Firm*—Shapiro and Shapiro

[57] ABSTRACT

Power assist steering gear assembly for vehicle comprises a first unit including an elongated member linearly movable in opposite directions for pivoting of dirigible wheels. The elongated member comprises a rack portion engaged with a pinion connected to a steering shaft and a thread portion cooperating with a ball nut. The power assist steering unit further comprises a separate electric motor unit including an electric motor connected to the ball nut through rotation transmitting means to assist the linear movement of the elongated member.

6 Claims, 5 Drawing Figures

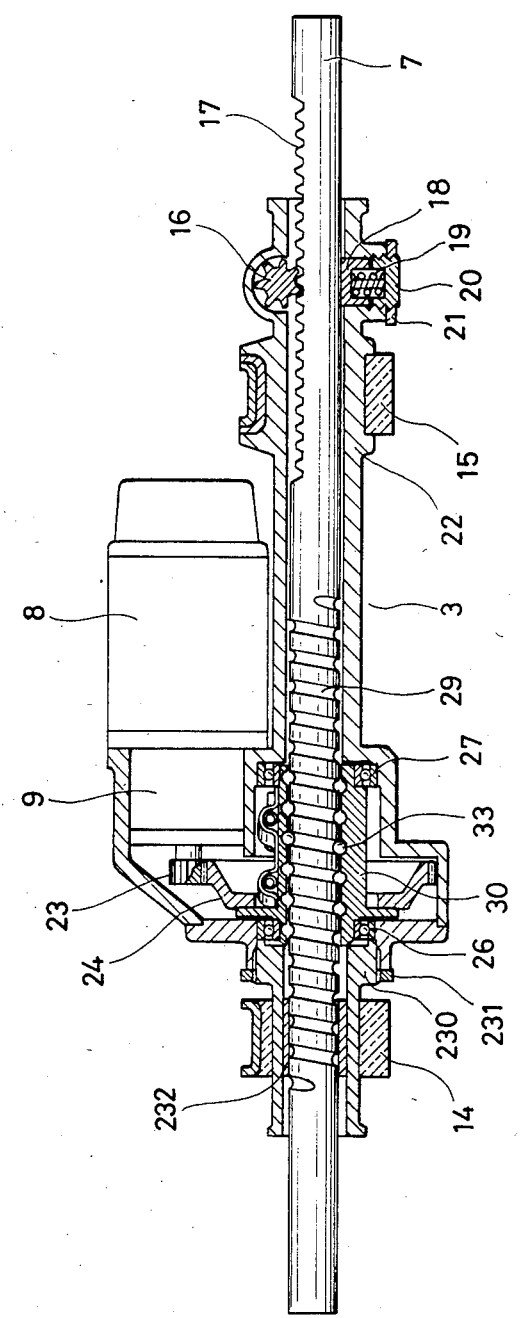

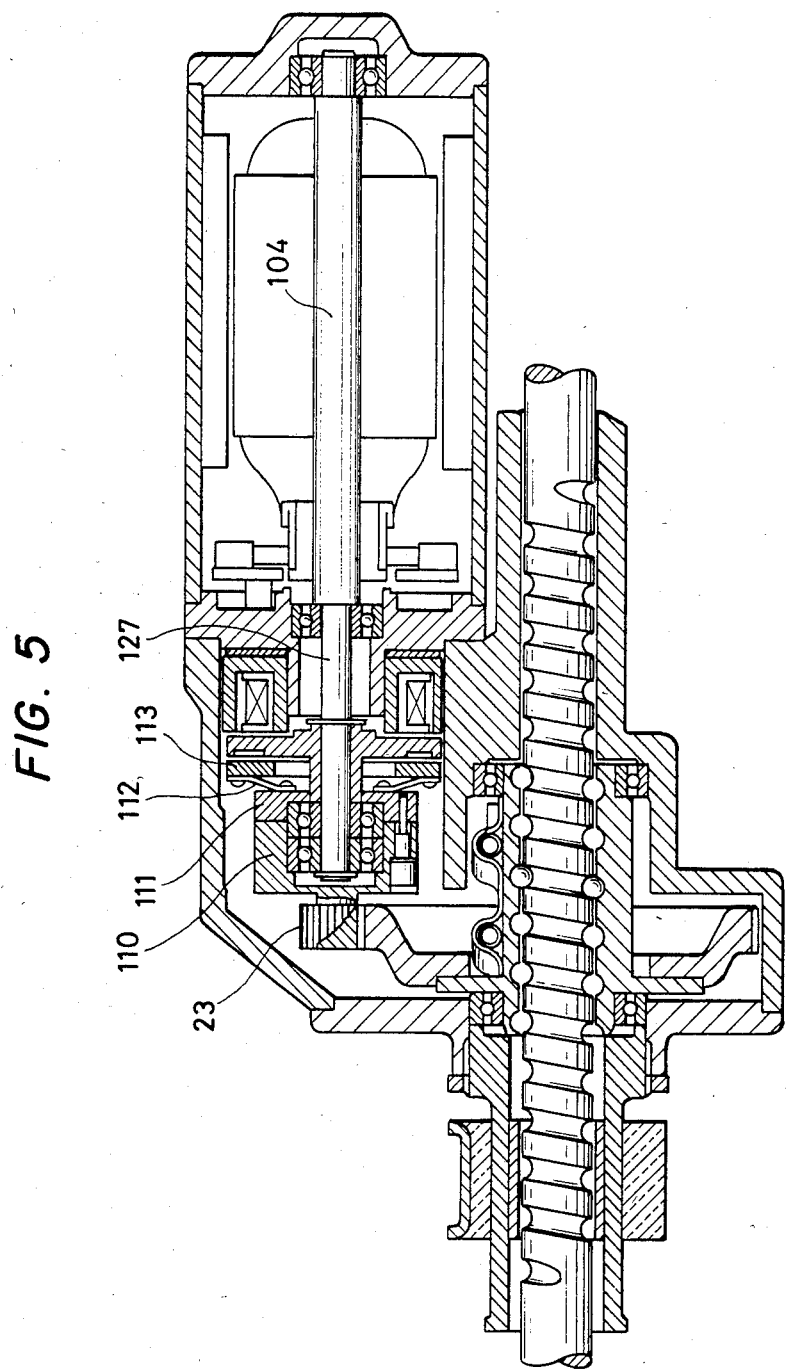

POWER ASSIST STEERING GEAR ASSEMBLY

BACKGROUND OF THE INVENTION

1. Field of the Invention

This invention relates to an electric type power assist steering device for a vehicle using an electric motor as a power source to reduce or assist the steering force of the steering wheel of the vehicle.

2. Description of the Prior Art

There are steering devices of the manually operated type and of the power-assisted type. In devices of the latter type, the steering power source reduces or assists the steering force. The power assist steering devices are further grouped into the electric type and the hydraulic type.

The electric type power steering device, as compared with the hydraulic type power assist steering device, is advantageous in that it does not require an oil pump as a power source connected to the engine and therefore there is no loss of engine horsepower; there is no possibility of leakage, contamination, deterioration or the like of hydraulic operating oil; maintenance is easy because operating oil is not used; hydraulic piping is not necessary, only electric wiring being required and thus assembly is easy; and an inexpensive system is possible because a highly accurate and delicate device such as an oil pressure control valve is not necessary.

SUMMARY OF THE INVENTION

It is an object of the present invention to provide an electric type steering device which can be easily incorporated into a limited space within an automotive vehicle.

It is a further object of the present invention to provide an electric type steering device in which an electric motor portion and a movement converting mechanism for converting a rotational movement into a rectilinear movement for steering are made into units, respectively, and are separated from each other, and which can be easily incorporated into an allowed space within an automotive vehicle.

BRIEF DESCRIPTION OF THE DRAWINGS

FIG. 2 is a cross-sectional view of the same embodiment.

FIG. 5 is a cross-sectional view showing the essential portions of a modification of the same embodiment.

DESCRIPTION OF THE PREFERRED EMBODIMENTS

Embodiments of the present invention will hereinafter be described by reference to the drawings.

Figure 1:
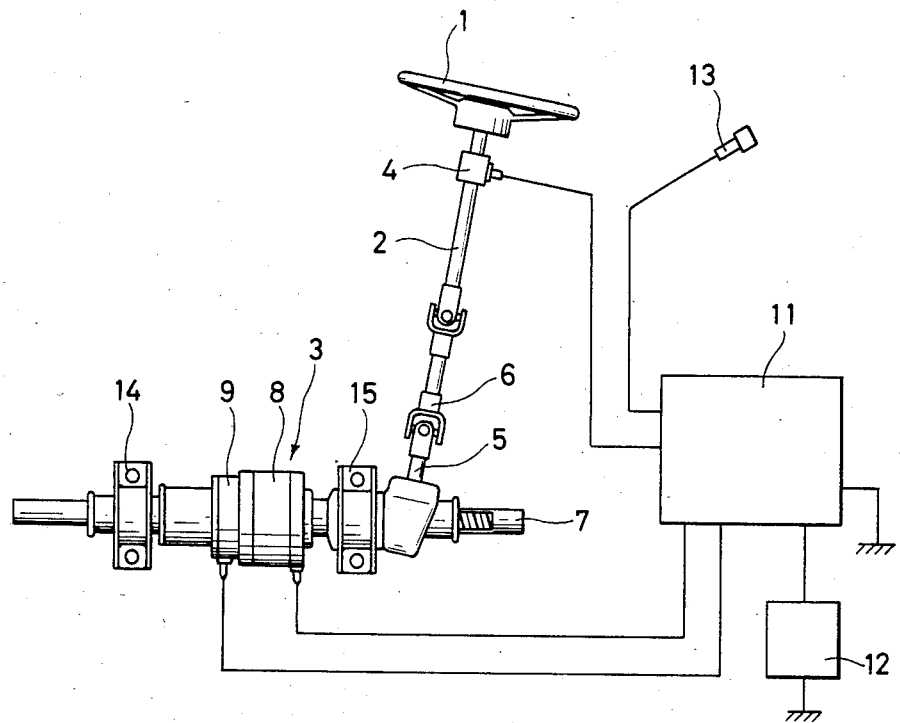
FIG. 1 shows a system adopting an embodiment of the electric type power assist steering device according to the present invention.

Referring to FIG. 1 which shows a steering device for a vehicle provided with an electrical power assist steering mechanism according to the present invention, reference numeral 1 designates a steering wheel and reference numeral 2 denotes a steering shaft to which the steering wheel is secured. The steering shaft 2 is connected to a pinion shaft 5 through a universal joint 6. The pinion shaft 5 has a pinion gear 16 (see FIG. 2) at the end thereof, the pinion gear 16 meshing with a rack 17 formed on an elongated power transmitting member 7 that is leftwardly and rightwardly movable on a steering device body 3 which will later be described.

The steering device body 3, which is a motion converting mechanism unit for converting a steering rotation input into a rectilinear movement for pivoting of the dirigible wheels of the vehicle, is provided with a power assisting motor unit 8 as a separate member. The rotation output from the motor unit 8 drives the power transmitting member 7 through rotation transmitting means including electromagnetic clutch means 9, and the mechanism for transmitting rotation from the motor unit to the power transmitting member 7 will later be described in detail by reference to FIGS. 2 and 3.

The steering shaft 2 is provided with a torque detector 4 for detecting the torque applied to the steering wheel, and the output of the torque detector 4 is connected to a control circuit 11. The control circuit 11 in turn may be connected to other input sources such as a vehicle speed detector 13 as required. Designated by 12 is an electric power source. The control circuit 11 is connected to the electric motor unit 8 and the electromagnetic clutch 9 and controls the electric motor unit 8 and the electromagnetic clutch 9 on the basis of the information of the torque applied to the steering shaft and/or the vehicle speed, but this control circuit is not directly related to the present invention and therefore need not be described in detail. Generally, the body 3 is fixed to the vehicle by brackets 14 and 15. Ball joints (not shown) are mounted at the opposite ends of the power transmitting member 7 and are connected to dirigible wheels (not shown) through knuckle arms or the like in a known manner.

The body 3 of the electric type power assisting steering mechanism which is an embodiment of the present invention will now be described in detail by reference particularly to FIGS. 2 and 3.

As previously described, reference numeral 16 designates the pinion gear formed on the pinion shaft 5 and reference numeral 17 denotes the rack gear having rectilinear teeth formed on the power transmitting member 7. Reference numeral 18 designates a pressure pad subjected to a load in the radial direction of the power transmitting member 7, i.e., the direction perpendicular to the lengthwise direction thereof, reference numeral 19 denotes a spring which imparts a meshing pre-pressure to the helical pinion gear 16 and the rack gear 17 through the pad 18, reference numeral 20 designates a lid member which can adjust the meshing prepressure, reference numeral 21 denotes a locking nut for fixing the lid member 20, and reference numeral 22 designates a housing member.

A worm 29 is formed at another location on the power transmitting member, and a ball nut 30 surrounding a part of the worm 29 is provided. In the case of the present embodiment, the ball nut 30 is provided with two ball circulation paths 30a and 30b, and a number of balls 33 (only some of which are shown) are disposed to be circulated in these ball circulation paths 30a, 30b and between the ball nut 30 and the worm groove corresponding thereto and thus, the worm 29, the ball nut 30 and the balls 33 together constitute ball screw and nut means known per se as disclosed in U.S. Pat. No. 2,380,662.

The ball nut 30 has its opposite ends rotatably supported on the housing 22 by ball bearings 26 and 27. The ball nut 30 has a flange 30c to which a gear 24 is secured. The gear 24 is in mesh engagement with a pinion gear 23 for taking out the rotation output of the electric motor unit 8 through the electromagnetic clutch 9 (which will later be described). The gears 23 and 24 together constitute rotation transmitting means for transmitting the rotation output of the electric motor unit 8 to the ball nut 30 at a predetermined reduction gear ratio. Thus, in response to the forward or reverse rotation output of the motor unit 8, the ball nut 30 also rotates in the forward or reverse direction and in response to this rotation of the ball nut 30, the power transmitting member 7 rectilinearly moves rightwardly or leftwardly.

Reference numeral 230 designates a lid member for imparting a pre-pressure to the bearings 26 and 27, reference numeral 231 denotes a locking nut for fixing the lid member 230, and reference numeral 232 designates a rack bushing for receiving the load in the radial direction of the rack shaft 7 as will later be described.

The construction of the motor unit 8 and the electromagnetic clutch 9 will now be described in detail by reference particularly to FIG. 3.

The motor unit 8 has a housing comprised of a cylindrical housing body 100 and opposite side members 101, 102 secured thereto. A stator 107 is provided on the inner peripheral portion of the housing body 100. A rotary shaft 104 is rotatably but axially immovably supported at the centers of the opposite side members 101 and 102 by bearings 105 and 106. A rotor 108 is provided on the motor shaft 104 in radially facing relationship with the motor stator 107. The rotor 108 is provided with an electromagnetic coil and is supplied with electric power from the control circuit 11 thorugh brushes 109, but the motor itself is of a conventional structure and need not be described in detail.

In the case of the present embodiment, the motor unit 8 is so disposed above the rack 17 that the rotary shaft 104 is substantially parallel to the power transmitting member 7. The motor unit 8 or the rotary shaft 104 may be disposed at any desired position about the power transmitting member 7 or in suitably inclined relationship with respect to the power transmitting member 7 in accordance with the space in the vehicle in which the present steering device is installed, or may be provided oppositely in direction to the case of the present embodiment. In such a case, the rotation transmitting means for transmitting the motor output to the ball nut 30 is suitably modified.

The rotary shaft 104 of the motor has a portion 104a outwardly projecting through the side member 102 of the housing, and a conical member 110 is secured to the portion 104a. The conical member 110 has a ring member 111 secured to the enlarged end portion thereof. A plate spring 112 is secured to the side surface of the ring member 111, and a rotation transmitting plate 113 formed of a magnetic material is secured to the plate spring 112.

A clutch housing 120 is secured to the aforementioned steering mechanism housing 22 and the motor housing side plate 102, and a support ring 121 is secured to a portion of the inner peripheral surface of the clutch housing 120. An annular electromagnetic coil 123 is disposed on the support ring 121. The electromagnetic coil 123 is connected to the control circuit 11 (FIG. 1) and is ON-OFF-controlled by the control circuit 11. A shaft 127 is rotatably supported in the inner peripheral surface of the support ring 121 through ball bearings 125 and 126. That end portion of this shaft 127 which is adjacent to the motor is supported by the aforementioned conical member 110 and ring member 111 through a ball bearing 129. A friction disk 130 is secured to the shaft 127. A friction lining 130a or the like is suitably provided on that side of the friction disk 130 which faces the rotation transmitting member 113. The aforementioned pinion gear 23 is secured to the opposite end portion of the shaft 127.

Figure 3:
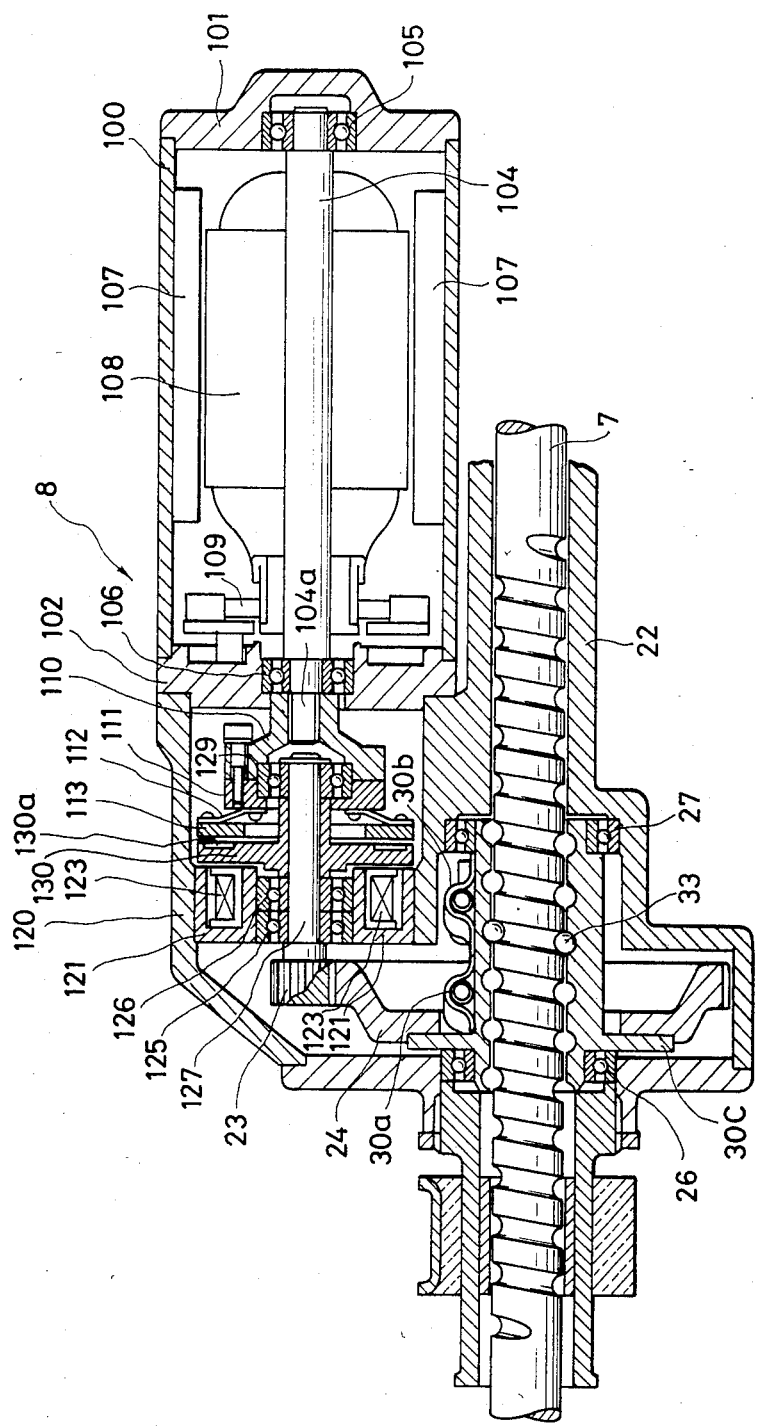
FIG. 3 is an enlarged cross-sectional view of the essential portions of the same embodiment.

With such a construction, the rotation transmitting member 113 is normally biased to the right as viewed in FIG. 3 by the action of the plate spring 112 and is in non-engagement with the friction disk 113, but when the electromagnetic coil 123 is energized, the rotation transmitting member 113 is attracted leftwardly toward the electromagnetic coil 123 as viewed in FIG. 3 with a result that the rotation transmitting member 113 comes into frictional engagement with the friction disk 130 and becomes capable of transmitting the rotation output of the motor to the shaft 127 and the pinion gear 23.

As shown in FIG. 5, the rotation transmitting plate 113 axially movable by the action of the electromagnetic coil, the plate spring 112 and the members 110, 111 may be connected to the pinion gear 23 and the axially immovable friction disk 130 and the shaft 127 may be mounted on the rotary shaft 104 of the motor.

In the above-described construction, the rack gear 17 and the worm 29 of the ball screw are formed at discrete locations on the power transmitting member 7. The pinion gear 16 is in mesh engagement with the rack gear 17 to transmit rotation of the steering wheel 1 in the lengthwise direction of the power transmitting member 7 and also cooperates with the pressure pad 18 to prevent the power transmitting member 7 from rotating about the lengthwise central axis thereof. On the other hand, the nut 25 of the ball screw is supported by the bearings 26 and 27 through the balls 33 so as to be rotatable relative to the housing member 22 and is combined with the worm 29. The reduction gear 24 is formed integrally with the nut 30, and this gear 24 meshes with the pinion gear 23 to transmit the output of the electric motor unit 8 disposed parallel to the axis of the power transmitting member 7 to the reduction gear 24 through the clutch 9 and convert the rotation output of the electric motor unit 8 into a movement in the lengthwise direction of the power transmitting member 7.

The control circuit 11 receives from the torque detector 4 and/or the vehicle speed detector 13 electrical signals corresponding to the then steering wheel shaft torque and vehicle speed, respectively, processes these signals in a predetermined manner and outputs control signals to the electric motor unit 8 and the clutch 9. Thus, the electric motor unit 8 is controlled so that change-over between manual steering and power steering is effected by the clutch 9 being suitably disengaged or engaged and so that a suitable output is obtained in conformity with the torque and vehicle speed detected during the power steering.

For example, during low speed running in which the steering power is heaviest, the clutch 9 can be engaged to control the electric motor unit 8 so that an output corresponding to the detected torque is obtained and the steering power applied to the steering wheel 1 is reduced by an amount corresponding to the output of the motor unit 8, and during high speed running in which the steering power is light and a more direct steering sense is required, the clutch 9 can be disengaged to provide manual steering and further, during power assist steering, the output of the electric motor unit 8 can be controlled with the vehicle speed, the angle of steering being also taken into account.

Also, to secure fail-safe operation, it is necessary to disengage the clutch 9 by the control circuit 11 so as to ensure that manual steering takes place when abnormality occurs.

Operation will hereinafter be described.

When the clutch is not in its operative condition, the output shaft of the electric motor unit 8 and the shaft of the pinion gear 23 of speed reduction means are separated from each other. When the steering wheel 1 is operated in this state, the rotation thereof is converted into a movement in the axial direction of the power transmitting member 7 by the mesh engagement between the pinion gear 16 and the rack gear 17, and the direction of each of the dirigible wheels is determined through a ball joint and a knuckle arm, not shown. This operation is the same as that of the popular manual rack and pinion type steering device.

When the clutch 9 is in its operative condition, the output shaft of the electric motor unit 8 and the shaft of the pinion gear 23 of speed reduction means are coupled together. When the steering wheel 1 is operated in this state, the steering wheel shaft torque corresponding to the load which the power transmitting member 7 receives from outside is detected by the torque detector 4 and is transmitted to the control circuit 11. Also, from the vehicle speed detector 13, the vehicle speed is transmitted to the control circuit 11. As previously described, the output of the electric motor unit 8 is controlled with a predetermined characteristic on the basis of these signals, and this output is transmitted to the power transmitting member 7 highly efficiently and at a great reduction gear ratio through the pinion gear 23, the reduction gear 24 and the ball screws 30, 33, 29.

Figure 4:
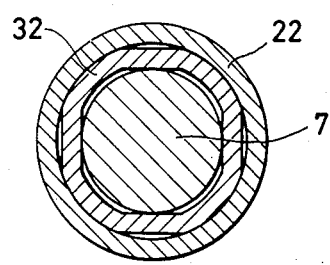
FIG. 4 is a cross-sectional view of the rack bushing portion of the same embodiment.

FIG. 4 exaggeratingly illustrates an example of the bushing 32 which receives the load in the radial direction of the power transmitting member used in this electric type power assist steering device. The radial load on the side of the ball screw and nut means of the power transmitting member 7 is basically received by the bearings 26 and 27 through the ball screw portion, but as a countermeasure for bad road running or the like, it is desirable that the bushing 32 as shown in FIG. 4 be formed by the use of an elastic material such as resin, and in a range in which the radial load is small, that the elastic deformability of the bushing be set to a great value so that almost all of the load is received by the bearings 26 and 27 through the ball screw and nut portion, and so that when the amount of elastic deformation of the ball screw and nut portion and bearings 26 and 27 increases with the load exceeding a certain set value, the bushing 32 comes into contact with the housing 22 so as to directly receive a radial load exceeding a predetermined value. Besides the above-described effect, this rack bushing 32 only contacts the power transmitting member 7 at several points in a normal range of steering in which the radial load is small, by being combined with the ball screw and nut means, and therefore the friction resulting from the axial movement of the power transmitting member 7 by the ball screw and nut means is small and light steering is possible and when a great radial load acts on the bushing from outside, the bushing 32 is deformed to increase the surface pressure of the surface contacting the power transmitting member 7, whereby friction is increased to prevent kickback and enhance the steering sense.

In the above-described embodiment, an actuator adopting ball screw and nut means is combined with the rack and pinion type steering device, and this eliminates the necessity of discretely providing a mechanism for preventing rotation of the worm 29 formed on the power transmitting member 7 which is indispensable in a ball screw and nut type direct-acting actuator.

Also, the reduction gear 24 is formed integrally with the nut 30 and is connected to the clutch 9 and the electric motor unit 8 through the pinion gear 23 which is in mesh engagement with the reduction gear 24 and therefore, the great reduction gear ratio which can be obtained only by the ball screw and nut means can be made greater so as to enable a compact, light-weight, highly efficient electric motor to be used and also enable the electric motor unit 8 and the clutch 9 to be mounted in parallelism along the power transmitting member 7, and this is very advantageous in terms of the space for mounting the electric motor unit 8 and the clutch 9.

Further, the reduction gear 24 formed integrally with the nut 30 can be made into a helical gear of resin, thereby reducing the inertia efficiency and enhancing the responsiveness of the steering and also decreasing gear noise.

Now, in the above-described embodiment, the torque detector 4 may be any conventional type using a strain gauge or magnetic strain and may also be installed on the pinion shaft 5. Also, the above-described embodiment adopts a form in which the opposite ends of the power transmitting member 7 which is the output shaft means are connected to the dirigible wheels through a ball joint, a knuckle arm, etc., but the present invention is also applicable to a so-called center take-off type device in which the central portion of the output shaft means is connected to the dirigible wheels.

According to the present invention, as described above, the output of the electric motor is transmitted through the reduction gear means and ball screw and nut means and this leads to a simple, compact and highly efficient structure and permits the use of a versatile electric motor generally having high speed and low torque characteristics.

Further, according to the present invention, the dirigible device portion including ball screw and nut means and a rack and pinion, and the power assisting means including the motor, are made into separate units, respectively, and therefore, even if the disposition of the motor is limited by the shape of the engine crank case, the differential gear case or the like of the automotive vehicle, it is possible to mount the motor in a location where there is a space and thus, it becomes possible to apply the electrical power assist steering device to small automotive vehicles.

Furthermore, according to the present invention, there is provided an electric type steering device in which the influence of magnetism and heating of the power assisting electric motor portion is not imparted to the mechanism for converting a rotational movement into a rectilinear movement.

Still further, according to the present invention, there is provided an electric type steering device in which when the assisting power from the motor is being interrupted, the connection between the motor and the aforementioned converting mechanism is completely shut off to minimize the steering wheel torque and provide good return of the steering wheel.

Furthermore, a power assisting electric motor and a mechanism for converting rotation to linear movement including rack and pinion gear means and ball screw and nut means, are made into separate units so that the electric motor unit may be disposed at a desired location, and therefore the electric type steering device of the present invention can be assembled in various cars with no modification of the engine crank case as well as the differential gear case.

I claim:

1. Power assist steering assembly for vehicles comprising:
    rotary shaft means connected to a steering wheel to be rotated in unison therewith;
    an elongated member linearly movable in opposite directions for pivoting of dirigible wheels;
    cylindrical means supported by a vehicle body and circumscribing the elongated member to support the elongated member for linear movement in said opposite directions, but non-rotatably;
    rack and pinion gear means for drivingly connecting the rotary shaft means and the elongated member, the gear means including a pinion gear rotatable in unison with the rotary shaft means and a rack gear provided in the elongated member and disposed in meshing emgagement with the pinion gear;
    ball screw and nut means including thread means provided at a peripheral portion of the elongated member, rotatable nut means coaxially circumscribing at least a portion of said thread means and rotatably supported by said cylindrical means, and ball means for transmitting force from said nut means to said thread means;
    an electric rotary motor including a stator, a rotor and a rotation output member connected to the rotor, the electric motor being positioned radially outside of said cylindrical means;
    rotation transmitting means for transmitting rotation from the motor to the nut means of the ball screw and nut means, the rotation transmitting means including reduction gear means drivingly connected to said nut means, and electromagnetic clutch means disposed between the rotation output member of the motor and said reduction gear means for transmitting rotation from the motor to the reduction gear means when the electromagnetic clutch means is engaged and for completely disconnecting the reduction gear means from the motor when the clutch means is disengaged;
    means for detecting torque applied to the steering wheel; and
    means for controlling the motor and the electromagnetic clutch means separately in response to detection of torque by the torque detecting means.

2. Power assist steering assembly according to claim 1, wherein said reduction gear means includes a pinion gear connected to the electromagnetic clutch means as a rotation output element thereof and a gear engaging the pinion gear and connected to the nut means.

3. Power assist steering assembly according to claim 1, wherein said motor is so disposed that the rotation axis thereof is parallel to the length of the elongated member.

4. Power assist steering assembly for vehicles comprising:
    rotary shaft means connected to a steering wheel to be rotated in unison therewith;
    an elongated member for pivoting of dirigible means;
    means for supporting the elongated member for linear movement in opposite directions to pivot the dirigible means, but non-rotatably;
    rack and pinion gear means for drivingly connecting the rotary shaft means and the elongated member, the gear means including a pinion gear rotatable in unison with the rotary shaft means and a rack gear provided on the elongated member and disposed in meshing engagement with the pinion gear;
    ball screw and nut means including thread means provided on the elongated member, rotatable nut means circumscribing at least a portion of said thread means and ball means for transmitting force between said nut means and said thread means;
    an electric rotary motor having a rotation output shaft, the electric motor and the elongated member being so arranged that the rotation output shaft is entirely laterally spaced from the elongated member at one side thereof;
    rotation transmitting means for transmitting rotation from the motor to the nut means of the ball and screw means, the rotation transmitting means including reduction gear means drivingly connected to said nut means, and electromagnetic clutch means disposed between the rotation output shaft of the motor and said reduction gear means for transmitting rotation from the motor to the reduction gear means when the electromagnetic clutch means is engaged and for completely disconnecting the reduction gear means from the motor when the clutch means is disengaged;
    means for detecting torque applied to the steering wheel; and
    means for controlling separately the motor and the electromagnetic clutch means in response to detection of torque detecting means.

5. Power assist steering assembly according to claim 4, wherein said rotation output shaft of the motor is parallel to the elongated member.

6. Power assist steering assembly for vehicles comprising:
    rotary shaft means directly driven by a steering wheel;
    a first unit including a housing in which are encased an elongated member linearly movable in opposite directions for pivoting of dirigible wheels, a rack formed on a portion of the elongated member, a pinion gear engaged with the rack and connected to the rotary shaft means, thread means formed on another portion of the elongated member, nut means circumscribing at least a portion of the thread means and antifriction force transmitting means disposed between the thread means and the nut means;
    a second unit including an electric motor having a rotation output shaft and a housing for the motor which is separate from said housing of the first unit;
    the second unit being positioned outside the first unit with respect to a direction perpendicular to the elongated member;
    rotation transmitting means for transmitting rotation from the rotation output shaft of the motor to the nut means of said first unit, the rotation transmitting means comprising an electromagnetic clutch means which includes an input member connected to the output shaft of the motor and an output member, and reduction gear means which includes a pinion gear connected to the output member of the electromagnetic clutch means and a gear which is co-axially connected to the nut means and engaged with the last-mentioned pinion gear;

means for detecting torque applied to the rotary shaft means; and control means for separately controlling the motor and the electromagnetic clutch means in response to the torque detecting means.

* * * * *